United States Patent [19]
Floter

[11] 3,799,330
[45] Mar. 26, 1974

[54] DUNG REMOVER

[75] Inventor: Sigismund Floter, Hamburg, Germany

[73] Assignee: Alfa-Laval AB, Tumba, Sweden

[22] Filed: Aug. 22, 1972

[21] Appl. No.: 282,830

[52] U.S. Cl. .................... 198/224, 198/DIG. 18
[51] Int. Cl. ............................................. B65g 25/08
[58] Field of Search ............ 198/DIG. 18, 224, 222, 198/221

[56] References Cited
UNITED STATES PATENTS
3,306,435  2/1967  Wenger ............................. 198/224

Primary Examiner—Evon C. Blunk
Assistant Examiner—Douglas D. Watts

[57] ABSTRACT

By means responsive to reciprocation of a driving element, a dung scraper is first advanced step-by-step along a path while in a scraping position and is then returned step-by-step along the path while in a non-scraping position, said means including mechanism operable to press a clamp body against the driving element for effecting each said step during movement of the driving element in one direction and to loosen the clamp body from the driving element during movement thereof in the opposite direction.

11 Claims, 5 Drawing Figures

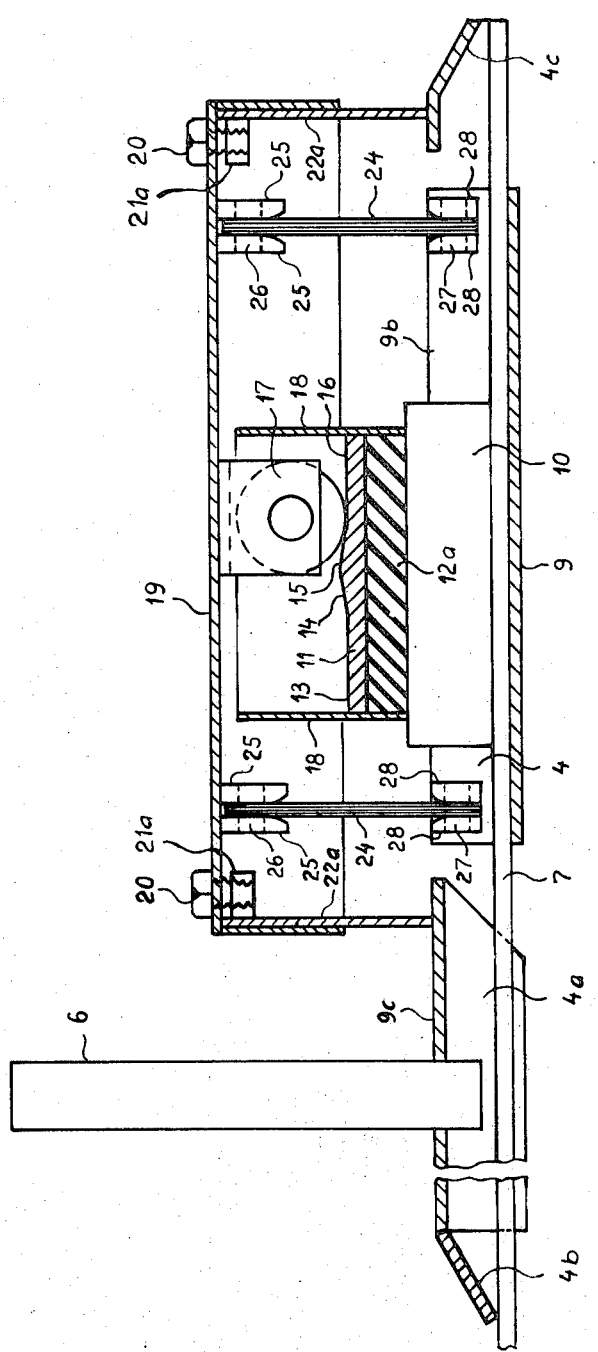

DUNG REMOVER

The present invention relates to dung removers of the type comprising a reciprocating driving element, such as a rod or cable, which advances a dung scraper step-by-step along a path while the scraper is in an operative or scraping position and then returns the scraper step-by-step along the path while the scraper is in a non-scraping position.

In prior dung removers of this type, the dung scraper is advanced stepwise by a reciprocating push rod and a ratchet device, which is reversible in its operating direction; and after moving along the full length of the path, the scraper is returned to its starting position for the next scraping operation. In this case, the dung scraper is provided with pawls which coact with teeth on the push rod. Such dung removers are relatively expensive to manufacture and sensitive to disturbances, and they are subject to rapid wear due to corrosion.

An object of the present invention is to provide a dung remover of the type described which is of simple construction and highly resistant to wear.

According to the invention, the scraper is moved step-by-step in an advancing passage and then in a returning passage along the dung-scraping path by means comprising a clamp body and mechanism operable to effect each said passage of the scraper by pressing this body against the reciprocating driving element for each said step during movement of the driving element in one direction and loosening the clamp body from said element during movement thereof in the opposite direction. The driving element is preferably a flat bar-iron and may advantageously pass through part of the dung scraper. In one embodiment of the invention, the clamp body has a cam-like running surface which rises and then descends, and a roller journalled to the dung scraper is arranged to roll along this running surface so as to alternately press the clamp body against and release it from the driving element as the latter reciprocates. Preferably, the running surface of the clamp body is generally parallel to the driving element, and the roller is adjustable vertically.

Additional features of the invention appear from the following description with reference to the accompanying drawings, which illustrate examples of the new dung remover. In the drawings, FIGS. 1 and 2 are schematic plan views of the dung remover with the scraper in its advancing or scraping position and in its returning or non-scraping position, respectively;

FIG. 5 is a side elevational view, partly in section, of parts of a modified embodiment.

Figure 1:
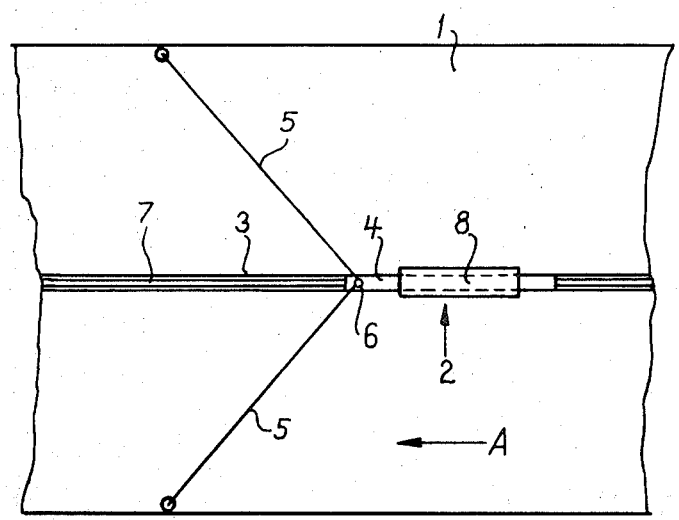
Figure 2:
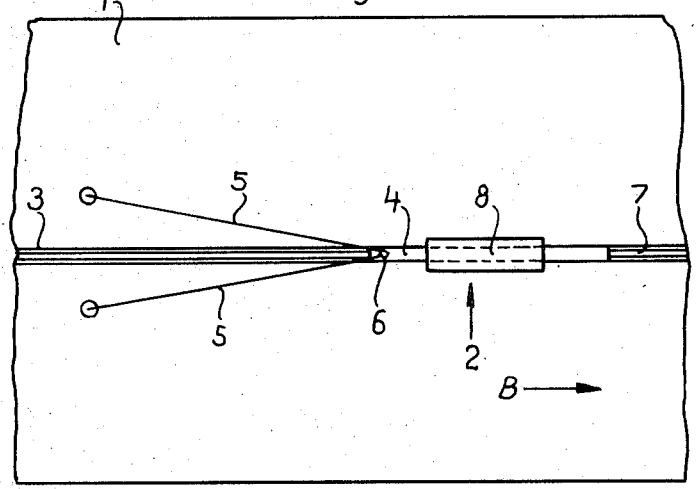

In FIGS. 1 and 2, a dung passage or scraping path 1 is provided; and a dung scraper 2 moves stepwise therealong in an operating or scraping direction, as shown by arrow A in FIG. 1, and in a return or non-scraping direction as shown by arrow B in FIG. 2. The dung passage 1 has a central longitudinal groove 3 in which a guide piece 4 of the dung scraper moves. Turnable scraper wings 5 are journalled on a pivot 6 at the fore end of the guide piece. These wings are spaced apart as they move in the operating direction (FIG. 1) and are collapsed as they move in the return direction (FIG. 2). A flat bar-iron 7, which may have a cross section of 8 × 25 mm, is also guided in the groove 3 and is moved back and forth by means of a driving device (not shown). Through a releasable clamping means shown generally at 8, the scraper 2 is clamped to the reciprocating element 7 only during the latter's movements in one direction, as the scraper advances or returns along the full length of path 1.

Figure 3:
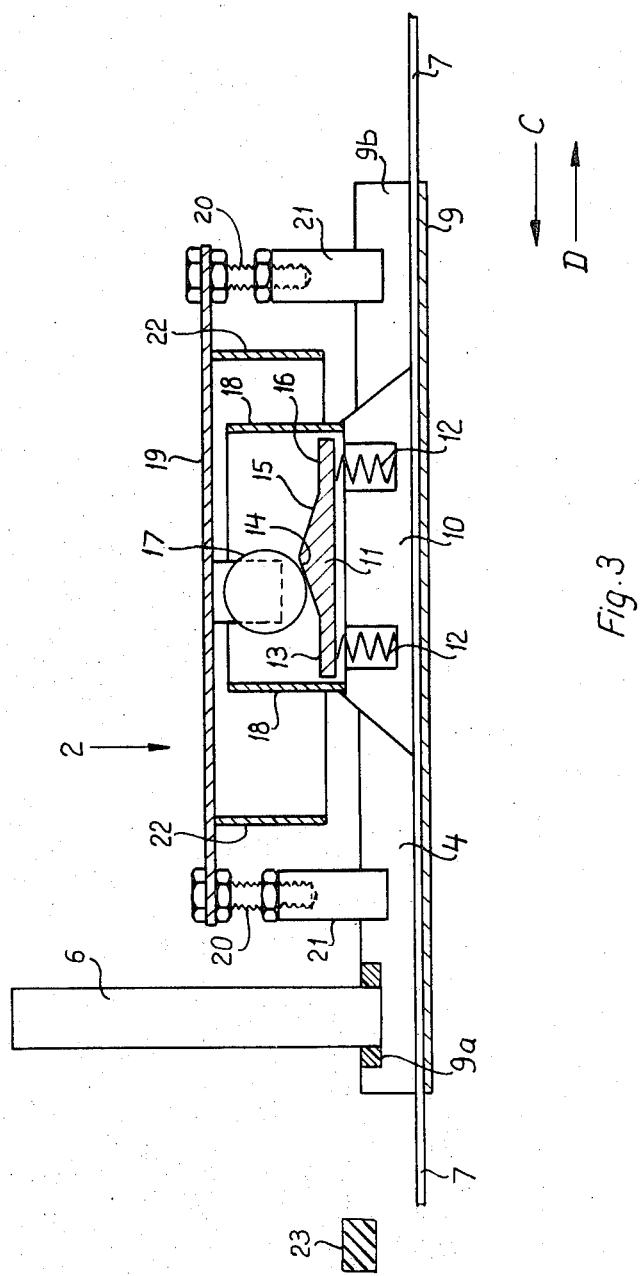
FIG. 3 is a side elevational view, partly in section, of parts of the dung remover as they appear during advancing movement of the reciprocating driving element.

According to FIG. 3, the guide piece 4 is U-shaped in cross section, the flat bar-iron 7 being guided along the bottom 9 of the U-shape. The pivot 6 is welded to a bridge 9a between the legs 9b of the U. A clamp body 10 is also guided between these legs and lies against the top of the reciprocating flat bar-iron. A body 11, which is carried by the clamp body 10 by means of compression springs 12, is provided with running surfaces 13 to 16 for a press-roller 17. Instead of the compression springs 12, oil-resistant rubber strips may be used as resilient elements. The running surfaces 13 and 16 extend mainly in parallel to the flat bar-iron 7, while the running surfaces 14 and 15 rise and descend, respectvely, in relation to the surfaces 13 and 16. The body 11 is surrounded by a housing 18 which is open at the top and filled with oil. The press-roller 17 is journalled on a plate 19, the latter being arranged for vertical adjustment by means of screws 20 which are screwed into four studs 21. These studs are welded to the legs of the U-shaped guide piece 4. The plate 19 carries dependent metal seets 22, which shield the housing 18.

Figure 4:
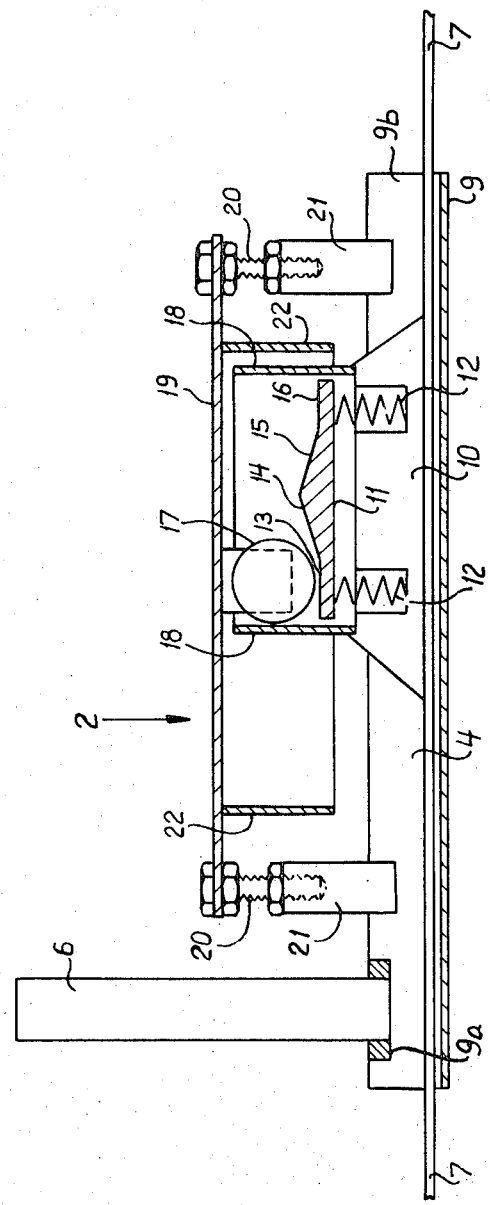
FIG. 4 is a view similar to FIG. 3 but showing the parts as they appear during returning movement of said element.

When the flat bar-iron 7 moves in the operating direction indicated by the arrow C, the clamp body 10 lying on the flat bar-iron is entrained so that it is moved in the same direction. The press-roller 17 then rolls along the running surface 13 in the direction toward the running surface 14. Due to the incline of the latter, the body 11 is pressed downward against the action of the compression springs 12 and presses the clamp body 10 against the flat bar-iron 7. Thus, the press-roller 17 and the guide piece 4, connected to the press-foller via the plate 19 and the bolts 21, are advanced in the direction of the arrow C. When the reciprocating flat bar-iron 7 moves in the opposite or return direction, the press-roller 17 rolls along the running surface 14 back to the running surface 13 (FIG. 4). The body 11 is then lifted again by the springs 12 to its starting position so as to unloosen clamp body 10 from bar-iron 7. Thus, through the reciprocating movement of the flat bar-iron 7, the guide piece 4 and the scraper wings 5 are advanced stepwise in the direction of the arrow C. When the scraper 2 reaches its end position in this direction, it hits a stop 23 so that the press-roller 17 is forced past the ridge formed by the running surfaces 14 and 15. In this new position of the press-roller 17, it coacts with surface 15 so as to move scraper 2 stepwise each time the flat bar-iron 7 moves in the direction of the arrow D. During the return passage in this direction, the scraper wings 5 take the position shown in FIG. 2. At the end of its return passage, scraper 2 hits another stop (not shown) similar to stop 23, thereby forcing roller 17 past said ridge to its initial position for the next advancing passage of the scraper.

If a cow is lying in the scraping path and is hit by the dung scraper, the same thing happens (due to the increased movement resistance) as when the scraper hits either of the stops 23; i.e., the scraper reverses its movement direction. This means a protection of the animals.

As appears from the described embodiment, the present dung remover has a very simple design and functions satisfactorily with a minimum of movable parts. The press-roller 17 and the running surfaces 13 to 16 are submerged in an oil bath. The oil bath housing 18 is surrounded by the plate 19 and the side walls 22. Liquid is thus prevented from entering the oil bath, for if a level of liquid manure rises in the area of the clamp body 10, a slight super-atmospheric pressure is generated in the bell formed by the side walls 22 and the plate 19, this pressure preventing the liquid from rising in the bell.

The modification in FIG. 5 provides a pendulating suspension of the guide piece 4 from the plate 19. One of the plates 22a depending from plate 19 is connected to the back 9c of a guide piece 4a, which is separate from the guide piece 4 and the cross section of which has the form of an inverted U. The other plate 22a is connected to a drag shoe 4c, likewise separate from the guide piece 4. The guide piece 4a is provided with a drag shoe 4b. The purpose of the drag shoes is to push away dung in the groove 3. The screws 20 are screwed into shoulders 21a on the plates 22a. In the embodiment shown in FIG. 5, the compression springs 12 are replaced by a resilient, compressible rubber body 12a. The pendulating suspension is effected by means of plate springs 24. Their upper ends are fastened by pins 26 between shoulders 25 attached to the underside of the plate 19 and provided with holes, the pins thus passing through corresponding holes in the springs. In a similar way, the lower ends of the springs are fastened by pins 27 between shoulders 28 which are fixed between the legs 9b of the guide piece 4.

In the embodiment according to FIG. 5, when the dung scraper 2 is pulled to the left by means of he flat bar-iron 7, the springs 24 will swing clock-wise and thereby lift the guide piece somewhat upwards. At the same time, the roller 17 will roll up the running surface 15 and thereby press the clamp body 10 against the flat bar-iron 7. The lifting of the guide piece 4, effected by the springs, increases the clamping effect of the clamp body 10 against the flat bar-iron 7, as compared with the case in the first embodiment according to FIGS. 3 and 4. When the movement direction of the flat bar-iron is then reversed, the springs swing in the other direction to the vertical position, the roller 17 simultaneously rolling down the running surface 15. This loosens the engagement between the flat bar-iron 7 and the guide piece 4 and also between the clamp body 10 and the flat bar-iron 7, so that the scraper 2 will stop in the attained position. Due to the swinging of the springs, the loosening takes place appreciably easier than in the embodiment according to FIGS. 3 and 4. As in the case of the first embodiment, the scraper hits a stop (not shown) at the end of its passage in each of the advancing and returning directions, thereby forcing roller 17 past the aforementioned ridge of the running surface 13–16 and reversing the direction of the scraper's step-wise movement.

I claim:

1. The combination of a dung scraper reciprocable along a path and having a scraping position during an advancing passage thereof along said path, the scraper having a non-scraping position during a returning passage thereof along said path, a reciprocating driving element, and means responsive to reciprocation of said driving element for first moving the scraper step-by-step in said advancing passage along the path and then moving the scraper step-by-step in said returning passage along said path, characterized in that said means comprise a clamp body and mechanism operable to effect each said passage of the scraper by pressing said body against the driving element for each said step during movement of said element in one direction and loosening the clamp body from said element during movement thereof in the opposite direction, said clamp body having one face adapted to be pressed against the driving element and having a opposite face forming a cam-like running surface with a portion which rises and then descends, said mechanism including a press-roll journalled on the dung scraper and arranged to roll along said running surface.

2. The combination of claim 1, in which said driving element passes through part of said scraper.

3. The combination of claim 1, in which said press-roll is adjustable vertically relative to the scraper.

4. The combination of claim 1, comprising also a housing enclosing said running surface and open at the top, and oil filling said housing.

5. The combination of claim 4, comprising also a bell enclosing said housing and open at the bottom.

6. The combination of claim 1, in which the clamp body includes first and second parts movable relative to each other and having said one face and opposite face, respectively, and resilient means on which said second part is carried by said first part.

7. The combination of claim 1, in which the dung scraper includes a guide piece having a U-shaped cross section to form legs, said driving element and clamp body being guided between said legs.

8. The combination of claim 7, comprising also a dung passage forming said path and having a longitudinal groove, said guide piece being movable in said groove.

9. The combination of claim 5, in which the press-roll is carried by the roof of the bell.

10. The combiantion of claim 1, in which said means include a fixed stop at each end of said path and engageable by the dung scraper to actuate said mechanism for reversing the direction of said step-by-step movement.

11. The combination of claim 1, in which said means include a force-transmitting connection between the reciprocating driving element and the dung scraper and operable to pendulate in response to a reversal of the direction of movement of said driving element.

* * * * *